(12) United States Patent
Zhang et al.

(10) Patent No.: US 9,823,759 B2
(45) Date of Patent: Nov. 21, 2017

(54) TOUCH PANEL SCRIBING DETECTION DEVICE AND TOUCH PANEL SCRIBING DETECTION METHOD

(71) Applicants: BOE TECHNOLOGY GROUP CO., LTD., Beijing (CN); BOE (Hebei) Mobile Display Technology Co., Ltd., Gu'An, Hebei (CN)

(72) Inventors: Ze Zhang, Beijing (CN); Guowen Yang, Beijing (CN); Liwei Xue, Beijing (CN); Dongnian Han, Beijing (CN); Jian Li, Beijing (CN)

(73) Assignees: BOE TECHNOLOGY GROUP CO., LTD., Beijing (CN); BOE (HEBEI) MOBILE DISPLAY TECHNOLOGY CO., LTD., Gu'An, Hebei (CN)

( * ) Notice: Subject to any disclaimer, the term of this patent is extended or adjusted under 35 U.S.C. 154(b) by 41 days.

(21) Appl. No.: 15/094,034

(22) Filed: Apr. 8, 2016

(65) Prior Publication Data

US 2016/0334931 A1  Nov. 17, 2016

(30) Foreign Application Priority Data

May 12, 2015 (CN) .......................... 2015 1 0239333

(51) Int. Cl.
  *G06F 3/0354* (2013.01)
  *G06F 11/22* (2006.01)

(52) U.S. Cl.
  CPC ...... *G06F 3/03545* (2013.01); *G06F 11/2221* (2013.01)

(58) Field of Classification Search
  CPC .......................... G06F 3/03545; G06F 11/2221
  See application file for complete search history.

(56) References Cited

U.S. PATENT DOCUMENTS

| 6,112,783 | A  | * | 9/2000 | Newman | B23Q 9/0042 144/144.1 |
| 2008/0068229 | A1 | * | 3/2008 | Chuang | G06F 3/0418 341/34 |
| 2009/0160788 | A1 | * | 6/2009 | Chien | G06F 3/0416 345/173 |
| 2014/0111484 | A1 | * | 4/2014 | Welch | H04N 17/00 345/178 |

FOREIGN PATENT DOCUMENTS

| CN | 101697103 A | 4/2010 |
| CN | 101763196 A | 6/2010 |
| CN | 202404174 U | 8/2012 |
| CN | 202433451 U | 9/2012 |
| CN | 204155265 U | 2/2015 |
| TW | 201035748 A | 10/2010 |

OTHER PUBLICATIONS

Office Action dated Apr. 19, 2017 issued in corresponding Chinese Application No. 201510239333.4.

* cited by examiner

*Primary Examiner* — Liliana Cerullo
(74) *Attorney, Agent, or Firm* — Nath, Goldberg & Meyer; Joshua B. Goldberg

(57) ABSTRACT

The present invention discloses a touch panel scribing detection device and a detection method thereof. The touch panel scribing detection device includes a loading platform, a scribing standardization unit, a test unit and a signal unit. The touch panel scribing detection device can provide an accurate scribing test path, so the accuracy and efficiency of manual test on a touch panel can be improved.

11 Claims, 3 Drawing Sheets

TOUCH PANEL SCRIBING DETECTION DEVICE AND TOUCH PANEL SCRIBING DETECTION METHOD

FIELD OF THE INVENTION

The present invention relates to the field of display technology, and in particular to a touch panel scribing detection device and a touch panel scribing detection method.

BACKGROUND OF THE INVENTION

With the development of display technology, capacitive touch panels (CTPs) have developed rapidly. In order to obtain qualified capacitive touch panels, the capacitive touch panels need to be tested in general.

At present, the capacitive touch panels can be tested in an automatic scribing detection mode and a manual scribing detection mode. Under normal conditions, the automatic scribing detection mode is suitable for quality departments to carry out testing by way of small batch sampling inspection, so as to judge the functionality of the touch panels. However, the manual scribing detection mode is usually adopted on production lines. Since manual scribing may experience disconnection or offset due to hands tremble, it is difficult to guarantee the accuracy of scribing tracks. The existing judgment standard is as follows: the touch panel is judged as qualified if a first scribing detection result indicates the touch panel is qualified; and multiple scribing processes are needed to determine whether the touch panel is indeed unqualified if the first scribing detection result indicates the touch panel is unqualified.

It can be seen that the manual scribing detection has low efficiency and a certain error rate.

SUMMARY OF THE INVENTION

The present invention has been accomplished in order to solve the above problems and it is an object thereof to provide a touch panel scribing detection device which can provide an accurate scribing test path, realize efficient touch panel scribing detection and improve the accuracy and efficiency of manual test on a touch panel, and a touch panel scribing detection method.

According to a first aspect of the present invention, there is provided a touch panel scribing detection device comprising:

a loading platform;

a scribing standardization unit, movably arranged above the loading platform and used for providing a standard scribing path for a touch panel to be tested;

a test unit, used for receiving a touch signal of the touch panel to be tested, identifying an actual scribing path on the touch panel to be tested, and comparing the identified actual scribing path on the touch panel to be tested with the standard scribing path provided by the scribing standardization unit to judge the performance of the touch panel to be tested; and a signal unit, connected with the test unit, capable of being connected with the touch panel to be tested and a test signal input device, respectively, and used for accessing a picture signal as a test signal and transmitting the test signal to the touch panel to be tested, and transmitting the touch signal of the touch panel to be tested to the test unit.

According to a second aspect of the present invention, there is provided the touch panel scribing detection device according to the first aspect, wherein a groove is arranged on an upper surface of the loading platform, the scribing standardization unit includes a path plate, a track groove having the standard scribing path is arranged in the path plate, the path plate is movably arranged above the groove, and the touch panel to be tested is arranged in the groove and is located below the path plate.

According to a third aspect of the present invention, there is provided the touch panel scribing detection device according to the second aspect, wherein the scribing standardization unit further includes a fixing plate which is capable of being mutually engaged with the path plate, the fixing plate is movably arranged on the periphery of the groove, the size of the path plate is smaller than that of the groove, and the path plate is arranged on the fixing plate and is located at least above a central region of the groove.

According to a fourth aspect of the present invention, there is provided the touch panel scribing detection device according to the third aspect, wherein the fixing plate is of a frame-shaped structure with an opening on at least one side, the path plate has a plate-shaped structure with the track groove provided therein, upper surfaces of opposite inner frames of the fixing plate are lower than those of opposite outer frames, and the path plate is arranged on and absorbed to the upper surfaces of the opposite inner frames of the fixing plate with magnets.

According to a fifth aspect of the present invention, there is provided the touch panel scribing detection device according to the third aspect, wherein the fixing plate is connected with the loading platform by means of a slide rail or a hinge, and the path plate is detachably arranged above the fixing plate.

According to a sixth aspect of the present invention, there is provided the touch panel scribing detection device according to the first aspect, wherein the signal unit includes a signal adapter plate, the signal adapter plate is provided with a plurality of interfaces, and each interface is used for connection with the test signal input device to receive a picture signal for testing, and/or is used for connection with the touch panel to be tested and outputting the picture signal for testing to the touch panel to be tested, and/or is used for connection with the test unit and outputting the touch signal of the touch panel to be tested to the test unit.

According to a seventh aspect of the present invention, there is provided the touch panel scribing detection device according to the sixth aspect, wherein the signal unit further includes a signal connector, and the signal connector is used for connecting the signal adapter plate and the touch panel to be tested to transmit the picture signal or the touch signal between the signal adapter plate and the touch panel to be tested.

According to an eighth aspect of the present invention, there is provided the touch panel scribing detection device according to the seventh aspect, wherein the signal unit further includes a pull-out module, the pull-out module is arranged above the loading platform and is provided with a pull-out groove, and a connector of the signal connector is inserted into the pull-out groove and is used for connection with the touch panel to be tested.

According to a ninth aspect of the present invention, there is provided the touch panel scribing detection device according to the eighth aspect, wherein the pull-out module includes a pull-out sheet or a semi-contact pressure head.

According to a tenth aspect of the present invention, there is provided the touch panel scribing detection device according to the first aspect, wherein the test unit includes:

an identification module, used for identifying the actual scribing path on the touch panel to be tested according to the received touch signal of the touch panel to be tested; and a comparison module, provided with a database corresponding to the standard scribing path therein, and used for comparing the identified actual scribing path on the touch panel to be tested with the standard scribing path provided by the scribing standardization unit to judge the performance of the touch panel to be tested.

According to an eleventh aspect of the present invention, there is provided the touch panel scribing detection device according to the second aspect, further including a touch pen, wherein the touch pen is used by a tester to scribe on the touch panel to be tested according to the standard scribing path provided in the path plate, and the touch pen includes two contacts which are separately arranged in the same straight line and a connector for connecting the two contacts, and the two contacts are elastically connected.

According to a twelfth aspect of the present invention, there is provided the touch panel scribing detection device according to the first aspect, further including a control button, wherein the control button is connected with the signal unit and the test unit, respectively, and is used for starting or closing the test on the touch panel to be tested.

According to a thirteenth aspect of the present invention, there is provided a touch panel scribing detection method, the touch panel scribing detection device according to the first aspect is used in the touch panel scribing detection method for detection, and in the touch panel scribing detection method, a replaceable scribing standardization unit having a function of fixing the touch panel to be tested and a function of standardizing a set path is adopted to manually scribe on the touch panel to be tested according to a set and replaceable standard scribing path and obtain a result indicating whether the performance of the touch panel to be tested is qualified.

In the touch panel scribing detection devices according to the first aspect, the sixth aspect, the seventh aspect, the tenth aspect and the twelfth aspect and the touch panel scribing detection method according to the thirteenth aspect, an accurate standard scribing track can be provided to easily realize manual scribing detection of the touch panel, the accuracy of the scribing track is guaranteed and the detection speed is improved, so the production efficiency and the detection accuracy are greatly improved.

In the touch panel scribing detection devices according to the second aspect and the third aspect, since the movably arranged fixing plate and path plate are adopted, the fixing plate can be changed flexibly and easily to adapt to touch panels with different sizes, and the path plate can be changed flexibly and easily to adapt to different scribing modes, and thus the detection type of the touch panel is expanded.

In the touch panel scribing detection device according to the fourth aspect, no influence is exerted on the test of the touch panel to be tested, and it is convenient to pick and place the touch panel to be tested and change the path plate, so the detection efficiency is improved.

In the touch panel scribing detection device according to the fifth aspect, it is convenient to pick and place the touch panel to be tested, and thus damage phenomena such as breakage of the touch panel to be tested resulting from collision with the fixing plate or the path plate is avoided.

In the touch panel scribing detection devices according to the eighth aspect and the ninth aspect, the signal connector for connecting the signal adapter plate and the touch panel to be tested can be protected from being damaged, so as to effectively reduce the damage to the signal connector and effectively prolong the service lives of the signal connector and the signal adapter plate and further prolong the service life of the touch panel scribing detection device.

In the touch panel scribing detection device according to the eleventh aspect, the scribing force and sensitivity can be effectively controlled, and the scribing accuracy in a detection process can also be improved.

Figure 1:
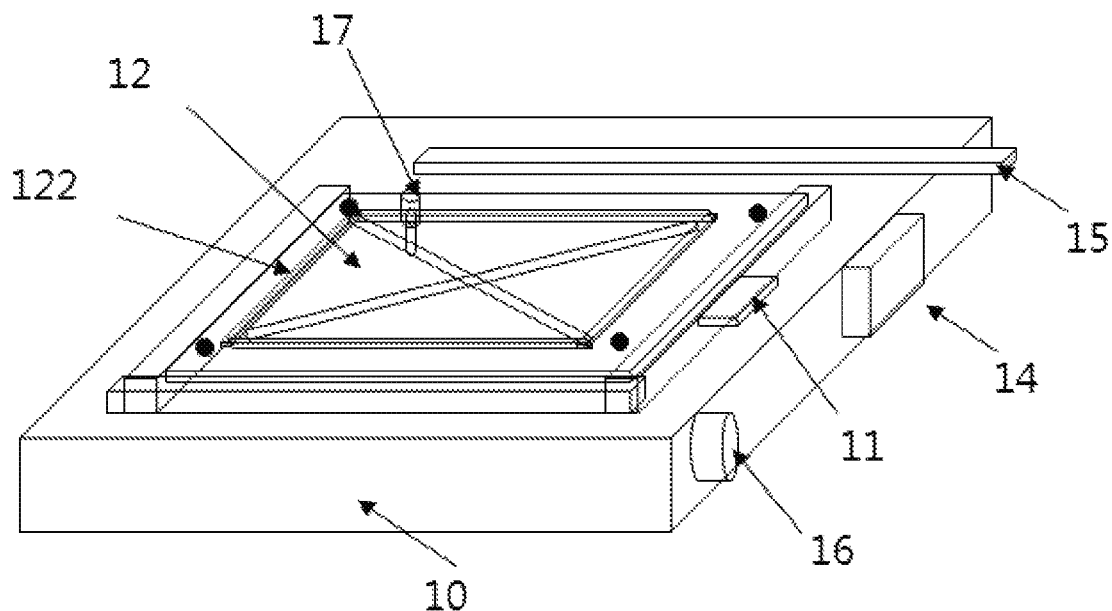
FIG. 1 is a schematic structure diagram of a touch panel scribing detection device according to an embodiment of the present invention.

LIST OF REFERENCE NUMERALS 10 loading platform; 11 fixing plate; 111 guide rail; 112 hinge; 1120 hinge handle; 12 path plate; 121 magnet; 122 track groove; 13 signal adapter plate; 14 test unit; 15 pull-out module; 151 pull-out sheet; 152 semi-contact pressure head; 1520 pull-out groove; 1521 pressure head tentacle; 16 control button; 17 touch pen;

2 PG lighting machine;

3 touch panel to be tested.

DETAILED DESCRIPTION OF THE EMBODIMENTS

In order that those skilled in the art can better understand the technical solutions of the present invention, a touch panel scribing detection device and a touch panel scribing detection method according to the present invention will be described below in detail in conjunction with the accompanying drawings and specific embodiments.

According to one aspect of the present invention, a touch panel scribing detection device is provided, the touch panel scribing detection device can provide various replaceable path plates with different scribing test paths, so as to provide accurate scribing test paths, and the touch panel scribing detection device is provided with an automatic processing unit to realize automatic detection of the performance of a touch panel, thereby realizing efficient scribing detection of the touch panel and improving the accuracy and efficiency of manual test on the touch panel.

The touch panel scribing detection device includes:

a loading platform;

a scribing standardization unit movably arranged above the loading platform and used for providing a standard scribing path for a touch panel to be tested;

a test unit used for receiving a touch signal of the touch panel to be tested, identifying an actual scribing path on the touch panel to be tested, and comparing the identified actual scribing path on the touch panel to be tested with the standard scribing path provided by the scribing standardization unit, to judge the performance of the touch panel to be tested; and a signal unit connected with the test unit, capable of being connected with the touch panel to be tested and a test signal input device, respectively, and used for accessing a picture signal as a test signal and transmitting the test signal to the touch panel to be tested, and transmitting the touch signal of the touch panel to be tested to the test unit.

As shown in FIG. 1, a groove (not shown) used for accommodating the touch panel to be tested is arranged on an upper surface of the loading platform 10, a scribing standardization unit is arranged on the loading platform 10, the scribing standardization unit includes a fixing plate 11 and a path plate 12 which can be engaged with each other, a track groove 122 having the standard scribing path is arranged in the path plate 12, the fixing plate 11 is movably arranged on the periphery of the groove, the path plate 112 is arranged above the groove (the fixing plate 11 is used for fixing the path plate 12 and supporting the path plate 12 above the groove), the touch panel 3 to be tested is arranged in the groove and is located below the fixing plate 11 and the path plate 12, and the path plate 12 is located at least above a central region of the groove. Since the fixing plate 11 and the path plate 12, which are movably arranged, are adopted, the fixing plate 11 can be changed flexibly and easily to adapt to touch panels with different sizes, and the path plate 12 can be changed flexibly and easily to adapt to different scribing modes. In this way, the detection type of the touch panel is expanded.

In the embodiment, sizes of the length and the width of the groove arranged in the upper surface of the loading platform 10 are larger than or equal to those of the touch panel 3 to be tested, the height of the groove is larger than or equal to that of the touch panel 3 to be tested, and optionally, the size of the groove can be flexibly set according to the size of the touch panel 3 to be tested, so as to fix the touch panel 3 to be tested well. The fixing plate 11 is generally provided with a framework adapted to the peripheral size of the groove, and the framework can support the path plate 12 well to scribe the touch panel 3 to be tested by means of the path plate 12. The path plate 12 can be flexibly designed according to different test scribing, so as to facilitate replacement. The sizes of the fixing plate 11, the path plate 12 and the track groove 122 in the path plate 12 can be customized according to the size of the touch panel 3 to be tested, in order to adapt to different types of touch panel products. In the embodiment, the touch panel to be tested is arranged in the groove of the loading platform 10 and below the fixing plate 11 and the path plate 12, and the touch panel to be tested can be replaced only by moving away the fixing plate 11.

Figure 2:
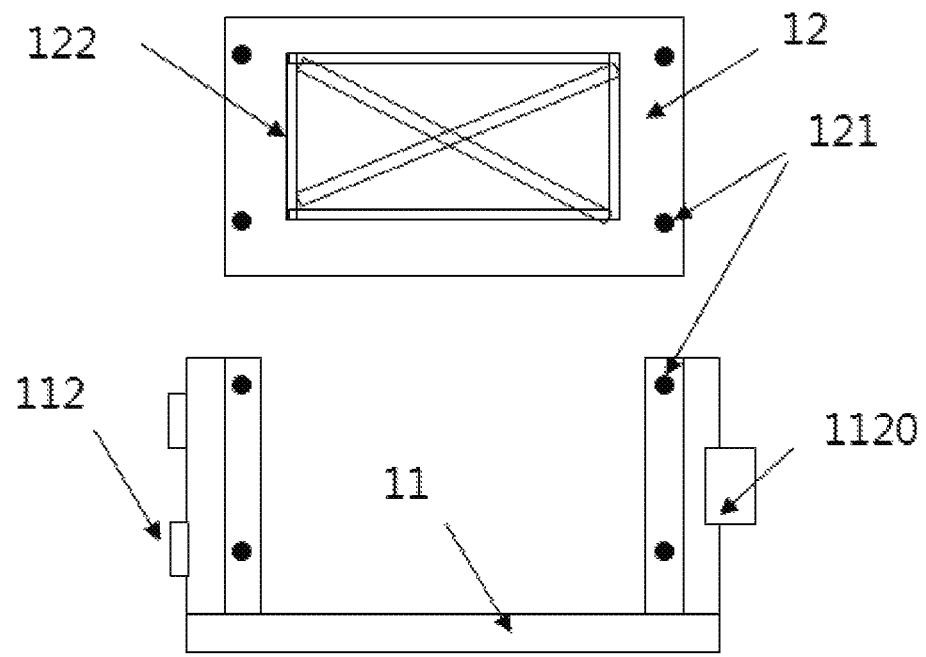
FIG. 2 is a schematic structure diagram of a fixing plate and a path plate of a scribing standardization unit in FIG. 1.

The scribing standardization unit establishes a convenient, standard and accurate manual scribing mode, preferably, as shown in FIG. 2, the fixing plate 11 is of a frame-shaped structure with an opening on at least one side, the path plate 12 has a plate-shaped structure with the track groove 122 provided therein, the upper surfaces of opposite inner frames of the fixing plate 11 are lower than those of opposite outer frames, and the path plate 12 is arranged on and absorbed to the upper surfaces of the opposite inner frames of the fixing plate 11 with magnets 121. The fixing plate 11 and the path plate 12 are adsorbed and fixed with the magnets 121 to exert no influence on the test of the touch panel 3 to be tested and facilitate picking and placing the touch panel 3 to be tested and change the path plate 12, so as to improve the detection efficiency.

Figure 3:
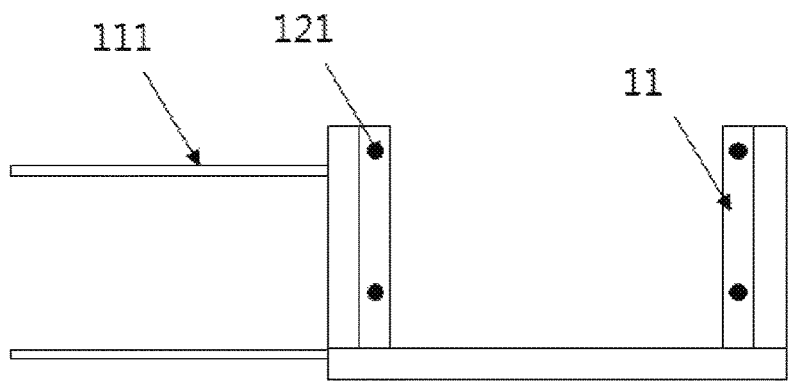
FIG. 3 is a schematic structure diagram illustrating connection between the fixing plate and a loading platform.

In terms of the connection among the fixing plate 11, the path plate 12 and the loading platform, the fixing plate 11 is connected with the loading platform 10 in a sliding or rotary manner, the path plate 12 is detachably arranged above the fixing plate 11, and the size of the path plate 12 matches with that of the touch panel 3 to be tested. As shown in FIG. 2, the connection between the fixing plate 11 and the loading platform 10 is implemented by a rotating element such as a hinge 112 or the like in a rotary manner (in order to facilitate picking and placing the touch panel 3 to be tested, a hinge handle 1120 can also be arranged); or, as shown in FIG. 3, the connection between the fixing plate 11 and the loading platform 10 is implemented by a sliding element such as a guide rail 111 in a sliding manner, so as to facilitate picking and placing the touch panel to be tested and avoid damage phenomena such as breakage of the touch panel to be tested resulting from collision with the fixing plate or the path plate.

The fixing plate 11 and the path plate 12 are separately designed to facilitate processing. It can be understood that the fixing plate 11 and the path plate 12 can also be integrally designed, namely, the peripheral size of the path plate 12 can be increased to a certain extent, such that the path plate 12 is provided with both the track groove having the standard scribing path and a framework which is movably arranged on the periphery of the groove, and can also be movably arranged above the loading platform 10 by way of the same connection in the sliding or rotary manner as that between the fixing plate 11 and the loading platform 10, and the track groove having the standard scribing path is located above the groove to conveniently scribe the touch panel 3 to be tested.

In the embodiment, the test unit 14 of the touch panel scribing detection device includes an identification module and a comparison module, wherein the identification module is used for identifying the actual scribing path on the touch panel 3 to be tested according to the received touch signal of the touch panel 3 to be tested; and the comparison module is provided with a database corresponding to the standard scribing path therein and is used for comparing the identified actual scribing path on the touch panel 3 to be tested with the standard scribing path provided by the scribing standardization unit to judge the performance of the touch panel 3 to be tested.

The test unit 14 is fixedly arranged on the loading platform 10, and optionally, the test unit 14 can also be arranged within or on the outer side of the loading platform 10 (the test unit 14 is arranged on the outer side of the loading platform 10 in FIG. 1, as an example).

Figure 6:
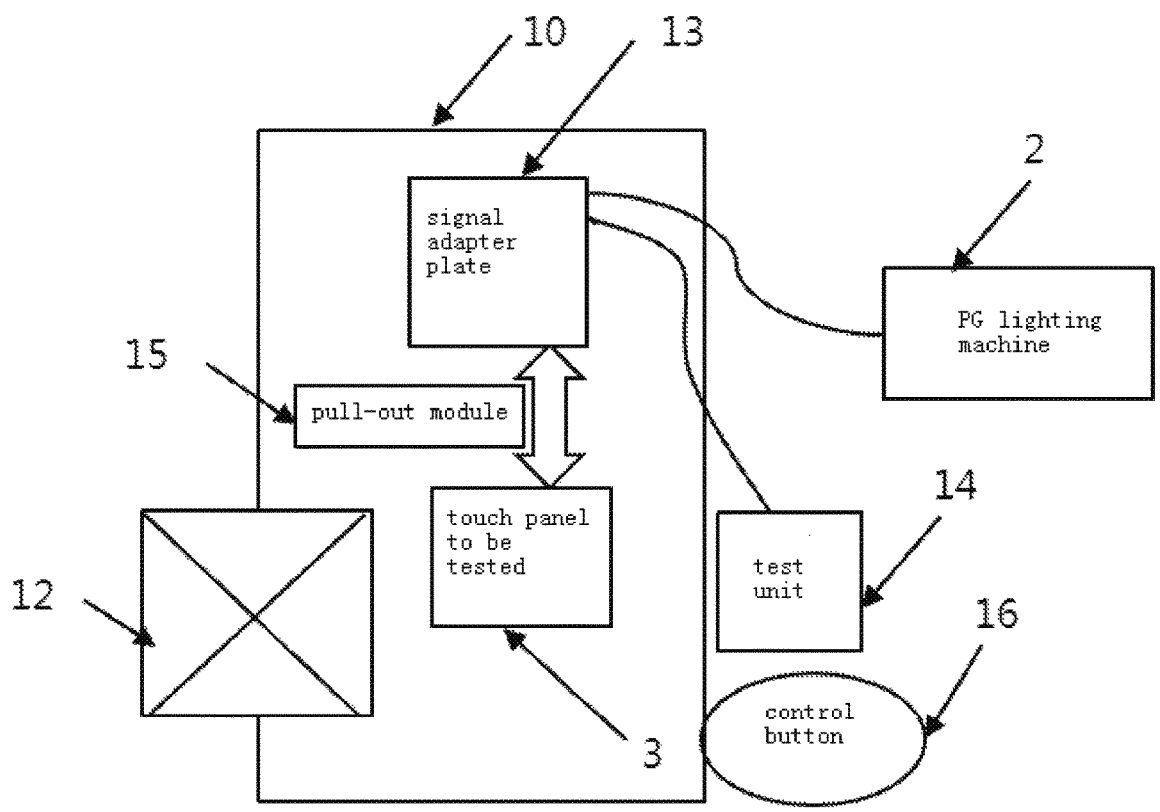
FIG. 6 is a schematic diagram illustrating use state of a touch panel scribing detection device according to an embodiment of the present invention.

The signal unit of the touch panel scribing detection device includes a signal adapter plate 13, which is provided with a plurality of interfaces, and each interface is used for connection with the test signal input device to receive a picture signal for testing, and/or is used for connection with the touch panel 3 to be tested (for example, via a signal connector (not shown in FIG. 6) used for connecting the signal adapter plate with the touch panel to be tested) and outputting the picture signal for testing to the touch panel 3 to be tested or receiving a touch signal after the touch panel 3 to be tested is tested, and/or is used for connection with the test unit 14 and outputting the touch signal of the touch panel 3 to be tested to the test unit 14.

For example, a 50-PIN interface is arranged in the signal adapter plate 13, and the touch panel scribing detection device is connected with a testing machine signal source (for example, a PG lighting machine 2) through a connecting line to lead the test signal to the touch panel scribing detection device and further transmit the test signal to the touch panel to be tested; a 34-PIN interface is arranged in the signal adapter plate 13, one end of the signal connector is connected with the 34-PIN interface through the connecting line, and the other end (i.e., a connector of the signal connector) of the signal connector is connected with the touch panel 3 to be tested to transmit the test signal to the touch panel 3 to be tested and transmit the touch signal generated on the touch panel 3 to be tested after scribing to the signal adapter plate 13; and a 16PIN interface is arranged in the signal adapter plate 13, and the signal adapter plate 13 is connected with the test unit 14 through a connecting line (the connecting line is arranged inside the loading platform) to transmit the touch signal generated on the touch panel 3 to be tested after scribing to the test unit 14 for detection. It can be understood that the connections relating to the above interfaces are merely exemplary, and can be flexibly designed according to the properties of the test signal or the connection protocol between the components in practical applications.

Further preferably, a module for facilitating disconnecting the touch panel 3 to be tested from the touch panel scribing detection device can be arranged between the signal adapter plate 13 and the touch panel 3 to be tested. In the embodiment, the signal unit further includes a pull-out module 15, which is arranged above the loading platform 10 and is provided with a pull-out groove 1520, and the connector of the signal connector is inserted into the pull-out groove 1520 and is used for being connected with the touch panel 3 to be tested, so that the pull-out module 15 can easily pull out (i.e., separate) the signal connector connected with the touch panel 3 to be tested.

Figure 4A:
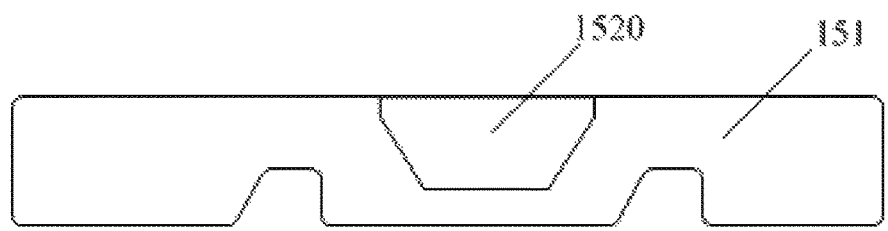
FIG. 4A and FIG. 4B are schematic structure diagrams of a pull-out module according to an embodiment of the present invention.

Preferably, as shown in FIG. 4A, the pull-out module 15 is a pull-out sheet 151, the pull-out sheet 151 is provided with the pull-out groove 1520, the signal connector is arranged below the pull-out sheet 151, and the connector of the signal connector is inserted into the pull-out groove 1520. When connecting the touch panel to be tested, a flexible circuit board (FPC) of the touch panel to be tested is placed in the pull-out groove, and the FPC of the touch panel to be tested and the connector of the signal connector are butted and are pressed downwards to connect the touch panel to be tested with the signal connector; and after the test is finished, the pull-out sheet 151 is gently uplifted with hand, and the touch panel to be tested can be separated from the signal connector, so that the touch panel 3 to be tested can be easily pulled out.

Figure 4B:
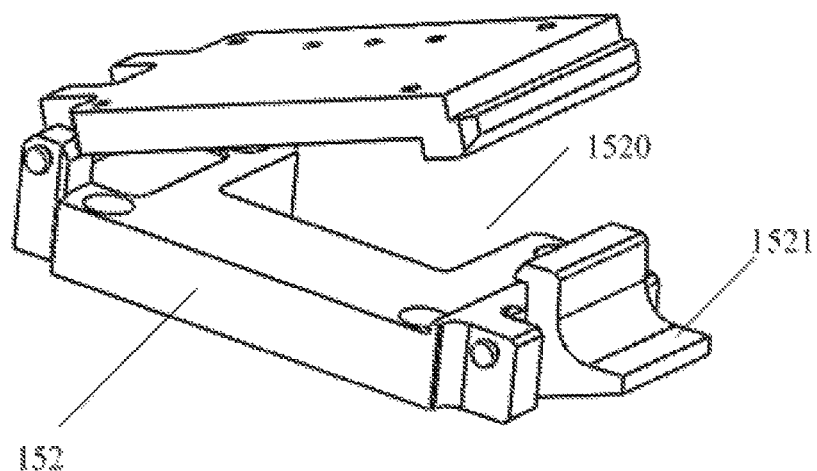

Optionally, as shown in FIG. 4B, the pull-out module 15 can be a semi-contact pressure head 152, the semi-contact pressure head 152 is provided with the pull-out groove 1520, the signal connector is arranged below the semi-contact pressure head 152, and the connector of the signal connector is inserted into the pull-out groove 1520. When connecting the touch panel to be tested, the FPC of the touch panel to be tested is placed in the pull-out groove, and the FPC of the touch panel to be tested and the connector of the signal connector are butted, and the upper half part of the semi-contact pressure head 152 is pressed downwards to be engaged with the lower half part of the semi-contact pressure head 152, so as to connect the FPC of the touch panel to be tested with the signal connector; and after the test is finished, a pressure head tentacle 1521 is slightly pressed with hand, the upper half part of the semi-contact pressure head 152 automatically pops open, and then the touch panel to be tested can be separated from the signal connector, so that the touch panel 3 to be tested can be easily pulled out.

Herein, according to types of the connectors for connecting different touch panels to be tested with the touch panel scribing detection device, the pull-out sheet 151 or the semi-contact pressure head 152 can be flexibly selected, and the size and the shape of the pull-out sheet 151 or the semi-contact pressure head 152 can be set according to actual demands. The pull-out module 15 can protect the signal connector for connecting the signal adapter plate with the touch panel 3 to be tested from being damaged, so as to effectively reduce the damage to the signal connector and effectively prolong the service lives of the signal connector and the signal adapter plate and further prolong the service life of the touch panel scribing detection device.

In the embodiment, a bottom surface of the semi-contact pressure head 152 is in contact with a top face of the loading platform, preferably, the signal connector and the pull-out module 15 are arranged on the side where the opening of the frame-shaped structure of the fixing plate 11 is located, and the opening of the pull-out groove 1520 in the semi-contact pressure head 152 faces to the groove of the loading platform for accommodating the touch panel to be tested, so as to facilitate connecting the touch panel 3 to be tested with the circuit of the touch panel scribing detection device.

It can be understood that, to facilitate a tester scribing the touch panel, the touch panel scribing detection device further includes a touch pen 17, and the touch pen 17 is used by the tester to scribe on the touch panel 3 to be tested according to the standard scribing path provided in the path plate 12. Under normal conditions, the path plate 12 is not in direct contact with the touch panel 3 to be tested (a gap about 1 cm is generally present therebetween, and the path plate 12 exerts no influence on the performance of the touch panel 3 to be tested), and the touch pen 17 is used for scribing on the touch panel 3 to be tested through the track groove in the path plate 12.

Figure 5A:
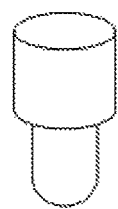
FIG. 5A and FIG. 5B are schematic structure diagrams of a touch pen according to an embodiment of the present invention.
Figure 5B:

As shown in FIGS. 5A and 5B, the touch pen 17 includes two contacts which are separately arranged in the same straight line and a connector for connecting the two contacts. For example, in the touch pen 17, an upper copper column and a lower copper column are elastically connected, so that the scribing force and sensitivity can be effectively controlled. Meanwhile, the touch pen 17 can be designed to have different diameters to adapt to the scribing corresponding to the track grooves having the standard scribing paths with different widths. In this way, the touch pen 17 moves along the track groove 122 in the path plate 12 to standardize the scribing path and improve the scribing accuracy in the detection process.

As shown in FIG. 1, the touch panel scribing detection device further includes a control button 16, and the control button 16 is connected with the signal unit and the test unit 14, respectively, and is used for starting or closing the test on the touch panel 3 to be tested. The control button 16 can be directly fixed on the surface or the side edge of the loading platform 10. Optionally, the control button 16 can be connected to the PG lighting machine 2 to control whether to carry out the detection or not (start or stop).

According to another aspect of the present invention, there is provided a touch panel scribing detection method, which uses the above touch panel scribing detection device to carry out detection, and uses a replaceable scribing standardization unit having a function of fixing the touch panel to be tested and a function of standardizing a set path to manually scribe on the touch panel 3 to be tested according to a set and replaceable standard scribing path and obtain a result indicating whether the performance of the touch panel 3 to be tested is qualified.

Specifically, by taking the fixing plate 11 and the path plate 12 whose structures are separately designed as an example, the touch panel scribing detection method includes the following steps:

(1) connecting the fixing plate 11 with the loading platform 10, and selecting a proper path plate 12 to engage with the fixing plate 11;

(2) opening the engaged fixing plate 11 and path plate 12, placing the touch panel 3 to be tested in the groove on the upper surface of the loading platform 10, and closing the fixing plate 11 and the path plate 12 for standardizing scribing;

(3) connecting the touch panel 3 to be tested with the signal adapter plate 13 through the signal connector, so as to establish a connection between the touch panel 3 to be tested and the touch panel scribing detection device;

(4) pushing the control button 16, and starting the connection of the PG lighting machine 2 and the touch panel scribing detection device;

(5) transmitting, by the PG lighting machine 2, the picture signal for testing to the touch panel 3 to be tested via the signal adapter plate 13 and the signal connector;

(6) scribing on the touch panel 3 to be tested along the track groove 122 in the path plate 12 with the touch pen 17 held in the tester's hand;

(7) transmitting scribing path information to the test unit 14 through the signal connector and the signal adapter plate 13;

(8) performing signal processing by the test unit 14 to obtain actual scribing path information, and making judgment;

(9) pressing the control button 16 to stop the test;

(10) separating the touch panel 3 to be tested from the signal connector through the pull-out module 15;

(11) opening the engaged fixing plate 11 and path plate 12, and taking out the touch panel 3 to be tested; and

(12) directly reading, by the tester, a detection result through the test unit, and finishing the test.

Of course, the step of engaging the path plate 12 with the fixing plate 11 in the step (1) can also be carried out after the touch panel 3 to be tested is placed in the groove in the step (2). The sequence of the above steps is merely exemplary and can be randomly changed according to practical application. In addition, for the use steps of the touch panel scribing detection device in which the fixing plate and the path plate are integrally designed, reference can be made to the use step of the touch panel scribing detection device in which the fixing plate and the path plate are separately designed, and the description thereof will not be repeated herein.

The touch panel scribing detection device and the touch panel scribing detection method provided by the present invention can provide an accurate standard scribing track, easily realize manual touch panel scribing detection, guarantee the accuracy of the scribing track and improve the detection speed, so the production efficiency and the detection accuracy are greatly improved, and they are particularly suitable for accurate and rapid detection of capacitive touch panels on production lines.

It should be understood that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

The invention claimed is:

1. A touch panel scribing detection device comprising:
a loading platform;
a scribing standardization unit movably arranged above the loading platform and configured to provide a standard scribing path for a touch panel to be tested;
a test unit configured to receive a touch signal of the touch panel to be tested, identifying an actual scribing path on the touch panel to be tested, and comparing the identified actual scribing path on the touch panel to be tested with the standard scribing path provided by the scribing standardization unit to judge the performance of the touch panel to be tested; and
a signal unit connected with the test unit, capable of being connected with the touch panel to be tested and a test signal input device, respectively, and configured to access a picture signal as a test signal and transmit the test signal to the touch panel to be tested, and transmit the touch signal of the touch panel to be tested to the test unit,
wherein a groove is arranged on an upper surface of the loading platform, the scribing standardization unit comprises a path plate, a track groove having the standard scribing path is arranged in the path plate, the path plate is movably arranged above the groove, and the touch panel to be tested is arranged in the groove and is located below the path plate, and
wherein the scribing standardization unit further comprises a fixing plate which is capable of being mutually engaged with the path plate, the fixing plate is movably arranged on the periphery of the groove, the size of the path plate is smaller than that of the groove, and the path plate is arranged on the fixing plate and is located at least above a central region of the groove.

2. The touch panel scribing detection device of claim 1, wherein the fixing plate is of a frame-shaped structure with an opening on at least one side, the path plate has a plate-shaped structure with the track groove provided therein, upper surfaces of opposite inner frames of the fixing plate are lower than those of opposite outer frames, and the path plate is arranged on and absorbed to the upper surfaces of the opposite inner frames of the fixing plate with magnets.

3. The touch panel scribing detection device of claim 1, wherein the fixing plate is connected with the loading platform by means of a slide rail or a hinge, and the path plate is detachably arranged above the fixing plate.

4. The touch panel scribing detection device of claim 1, wherein the signal unit comprises a signal adapter plate, the signal adapter plate is provided with a plurality of interfaces, and each interface is configured to connect with the test signal input device to receive a picture signal for testing, or is configured to connect with the touch panel to be tested and outputting output the picture signal for testing to the touch panel to be tested, or is configured to connect with the test unit and output the touch signal of the touch panel to be tested to the test unit.

5. The touch panel scribing detection device of claim 4, wherein the signal unit further comprises a signal connector, and the signal connector is configured to connect the signal adapter plate and the touch panel to be tested to transmit the picture signal or the touch signal between the signal adapter plate and the touch panel to be tested.

6. The touch panel scribing detection device of claim 5, wherein the signal unit further comprises a pull-out module, the pull-out module is arranged above the loading platform and is provided with a pull-out groove, and a connector of the signal connector is inserted into the pull-out groove and is configured to connect with the touch panel to be tested.

7. The touch panel scribing detection device of claim 6, wherein the pull-out module comprises a pull-out sheet or a semi-contact pressure head.

8. The touch panel scribing detection device of claim 1, wherein the test unit comprises:
an identification module configured to identify the actual scribing path on the touch panel to be tested according to the received touch signal of the touch panel to be tested; and
a comparison module provided with a database corresponding to the standard scribing path therein, and configured to compare the identified actual scribing path on the touch panel to be tested with the standard scribing path provided by the scribing standardization unit to judge the performance of the touch panel to be tested.

9. The touch panel scribing detection device of claim 1, further comprising a touch pen, wherein the touch pen is used by a tester to scribe on the touch panel to be tested according to the standard scribing path provided in the path plate, the touch pen comprises two contacts which are separately arranged in the same straight line and a connector for connecting the two contacts, and the two contacts are elastically connected.

10. The touch panel scribing detection device of claim 1, further comprising a control button, wherein the control button is connected with the signal unit and the test unit, respectively, and is configured to start or close the test on the touch panel to be tested.

11. A touch panel scribing detection method, wherein the touch panel scribing detection device of claim 1 is used in the touch panel scribing detection method for detection, and in the touch panel scribing detection method, a replaceable scribing standardization unit having a function of fixing the touch panel to be tested and a function of standardizing a set path is adopted to manually scribe on the touch panel to be tested according to a set and replaceable standard scribing path and obtain a result indicating whether the performance of the touch panel to be tested is qualified.

* * * * *